United States Statutory Invention Registration [19]

[11] Reg. Number: H892

Walk et al. [43] Published: Mar. 5, 1991

[54] THIN SHEET CASTING WITH ELECTROMAGNETIC PRESSURIZATION

[75] Inventors: Steven R. Walk, Winterport, Me.; R. Michael Slepian; Richard D. Nathenson, both of Pittsburgh, Pa.; Robert S. Williams, Fairfield, Ohio

[73] Assignee: The United States of America as represented by the United States Department of Energy, Washington, D.C.

[21] Appl. No.: 420,439

[22] Filed: Oct. 12, 1989

[51] Int. Cl.[5] ..... B22D 11/00

[52] U.S. Cl. ..... 164/463; 164/502; 164/423

[58] Field of Search ..... 164/423, 463, 466, 502

[56] References Cited

U.S. PATENT DOCUMENTS

| | | | |
|---|---|---|---|
| 3,096,158 | 7/1963 | Gaule et al. . | |
| 4,150,706 | 4/1979 | Reiniche et al. . | |
| 4,373,571 | 2/1983 | Yarwood et al. . | |
| 4,419,177 | 12/1988 | Pryor et al. . | |
| 4,469,165 | 9/1984 | Ungarean et al. . | |
| 4,516,625 | 5/1985 | Yarwood et al. . | |
| 4,572,279 | 2/1986 | Lewis et al. | 164/463 |
| 4,579,167 | 4/1986 | Kuznetsov . | |
| 4,607,683 | 8/1986 | Hamashima et al. | 164/463 |
| 4,635,705 | 1/1987 | Kuznetsov | 164/466 |
| 4,678,024 | 7/1987 | Hull et al. . | |

FOREIGN PATENT DOCUMENTS

| | | | |
|---|---|---|---|
| 2558085 | 7/1985 | France | 164/463 |
| 57-177861 | 11/1982 | Japan . | |
| 1329898 | 8/1987 | U.S.S.R. | 164/463 |

*Primary Examiner*—Michael J. Carone

*Attorney, Agent, or Firm*—Mark P. Dvorscak; Robert J. Fisher; William R. Moser

[57] ABSTRACT

An apparatus, method and system for the casting of thin strips or strips of metal upon a moving chill block that includes an electromagnet located so that molten metal poured from a reservoir onto the chill block passes into the magnetic field produced by the electromagnet. The electromagnet produces a force on the molten metal on said chill block in the direction toward said chill block in order to enhance thermal contact between the molten metal and the chill block.

29 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THIN SHEET CASTING WITH ELECTROMAGNETIC PRESSURIZATION

CONTRACTUAL ORIGIN OF THE INVENTION

The U.S. Government has rights in this invention pursuant to Contract No. DE-AC07-83ID12443 between the U.S. Department of Energy and Westinghouse Electric Corporation.

BACKGROUND OF THE INVENTION

Steel production is a very energy intensive industry with much of the energy consumed in hot deformation needed to process the steel into useful shapes. A prime example of such energy use is the production of thin strip where conventional practice requires large ingots to be hot rolled into slabs and then into strip before a final cold roll operation to the desired thickness. In recent years, much of the improvement in efficiency and reduction in energy consumption in the steel industry has resulted from the application of continuous slab casting technology, where steel slabs are produced directly from the melt. While the amount of hot deformation processing is greatly reduced, the need for a hot rolling operation is not eliminated entirely because of the limits on the minimum slab thickness possible using stationary chill molds.

It is recognized that substantial improvement in efficiency can be obtained with near-net-shape continuous casting. One example of near-net-shape continuous casting is thin sheet casting of high quality steel sheet with thicknesses on the order of 0.125 inch. The savings of such a casting technique are expected to be considerable with estimates ranging up to $50/ton. Two examples of techniques for thin sheet casting include planar flow casting and melt overflow casting.

In thin sheet casting techniques, such as planar flow casting and melt overflow casting, a molten metal (such as steel) flows through a nozzle which is submerged into a pool of molten metal. The nozzle geometry directs the flow of the molten metal along a chilled wheel (normally made of copper or a copper alloy) spinning at a relatively high rate of speed (up to 30 ft/sec). The chilled wheel is cooled by circulation of water in channels in the wheel or by the spray of water jets on the interior surface of the wheel. The molten metal on the bottom of the pool is dragged from the pool by the contact with the spinning wheel and solidifies as heat is transferred to the chilled wheel. The metal continues to solidify until the entire sheet is solid and is then removed from the wheel. It is estimated that with respect to steel, thin sheet direct strip casting offers the potential to reduce energy consumption by 17 to 32% over conventional strip fabrication technologies.

Essential to the success of thin sheet casting technique described above is a high rate of heat transfer from the solidifying metal to the chilled wheel. There are at least two reasons why a high rate of thermal transfer might not be maintained. First, centrifugal force acting on the solidifying metal strip can tend to throw the strip off the wheel. The force acting to throw the metal off the wheel is proportional to the metal density, metal thickness, and the square of the wheel speed. Second, there are forces which arise from the metal shrinkage and deformation occurring as the metal solidifies. These forces attempt to peel the solidifying strip away from wheel in small patches leaving gaps between the strip and the wheel. These gaps can seriously degrade the rate of heat transfer.

Of further necessity to melt spinning techniques is the need to carefully control or regulate the flow of metal as it enters upon the wheel. Physical constraints, such as ceramic troughs, channels, or nozzles are of limited use because of their cooling effect on the metal and friction and wear problems.

It is evident that puddle length is the limiting factor for all reasonable casting speeds. Low casting speeds may allow the production of strip thicknesses of up to 0.25 inches. Any techniques which assist in the control of large molten puddle lengths would allow higher casting speeds to be used to produce a given cast thickness or, alternatively, allow a greater cast thickness to be obtained at a given casting speed. Another consideration involves ensuring a smooth upper cast strip surface in order to improve the product quality.

The application of magnetofluidynamic (MFD) technology to the liquid metal pool on the casting surface allows for the exercise of control by the development of a radially oriented hold down body force (electromagnetic pressure) on the molten metal strip. Such a normal force would keep the hot metal in close contact with the water cooled casting substrate and thereby enhance the heat transfer and cooling of the cast product. An electromagnetic pressure applied on a solidifying strip could also be used to enhance the shape and surface quality of a thin metal strip cast upon a chilled casting surface.

Accordingly, it is an object of this invention to use thin strip casting to produce a sheet of metal up to 0.125 inch thick.

It is another object of this invention to utilize an electromagnetic force to hold down metal strip on a chilled casting surface.

It is an object of this invention to employ magnetofluidynamic forces to a solidifying metal strip to enhance the rate of heat transfer and thereby increase the thickness of the strip produced.

It is another object of this invention to ensure that a close thermal contact between a solidifying metal strip and a chill block by means of electromagnetic pressurization.

It is still a further object of this invention to provide a high intensity magnetic field required for flow control.

It is yet another object of this invention to provide an apparatus and techniques which assists in the control of large molten puddle lengths to allow higher casting speeds on a moving chill block to produce a given cast thickness or allow a greater cast thickness to be obtained at a given casting speed.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is an apparatus, method and system for the casting of thin strips of metal upon a moving chill block that includes an electromagnetic pressurization means located adjacent the moving chill block so that molten metal poured from a reservoir onto the chill block passes into the magnetic field produced by the electromagnetic pressurization means. The electromagnetic pressurization means produces a force on the molten metal on said chill block in the direction toward said chill block in order to enhance thermal contact between the molten metal and the chill block.

DETAILED DESCRIPTION OF THE INVENTION

The description of the preferred embodiment will refer to application of the present invention to the planar casting technique. It should be understood that the present invention can be applied with equal advantage to other thin strip casting techniques, such as the melt overflow casting technique.

Figure 1:
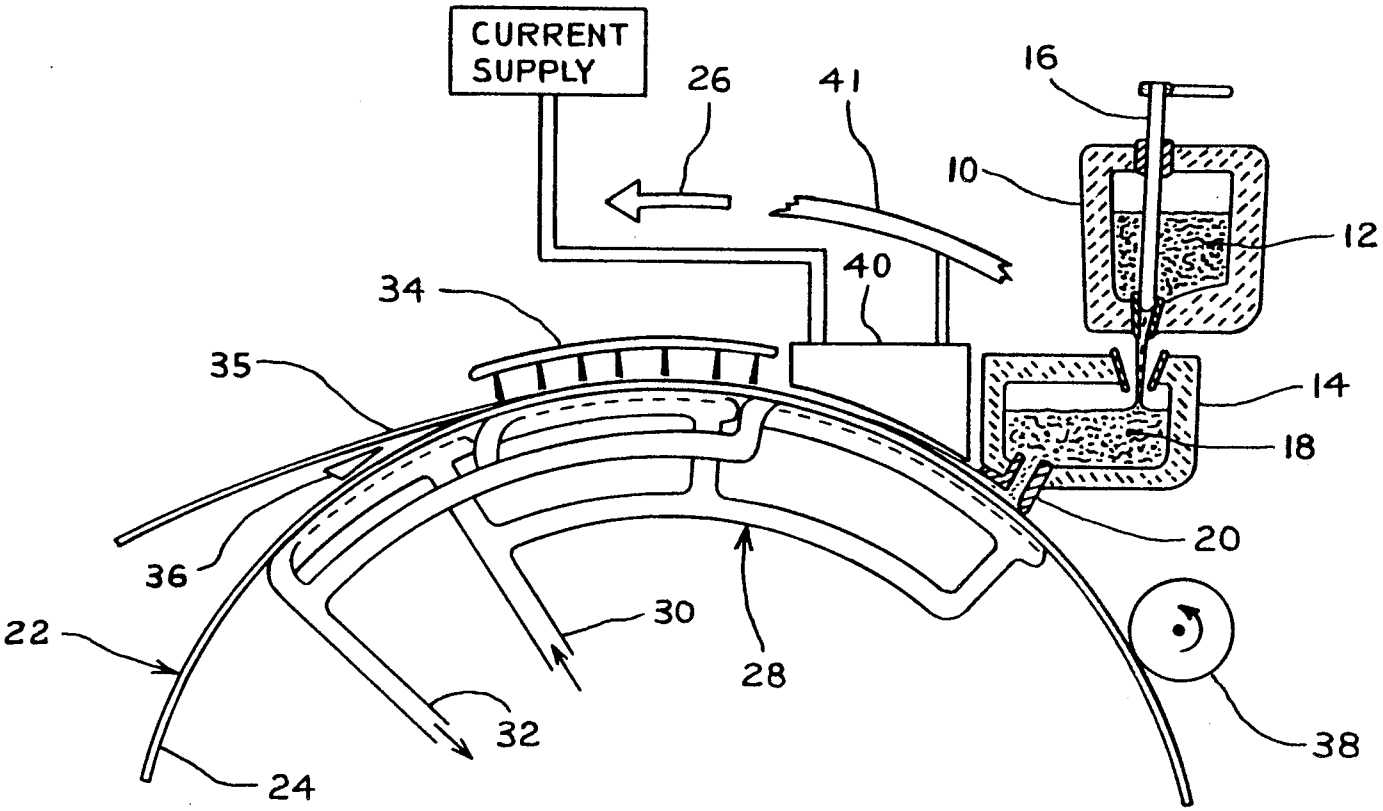
FIG. 1 depicts the present invention as used in a process for the casting of thin metal sheets.

Referring to FIG. 1, a ladle 10 containing molten metal 12 supplies the molten metal to nozzle chamber 14. A stopper rod 16 in ladle 10 is employed to regulate or shut off the supply of molten metal 12 from ladle 10 to nozzle chamber 14. Molten metal 18 in nozzle chamber 14 can exit via nozzle 20 which is directly over spinning chill block 22. Chill block 22 can be rotating wheel having a casting rim 24 upon which the molten metal from the nozzle can be cast into a thin metal strip. In a typical continuous casting operation for which this invention was intended, the wheel may have an outer diameter of approximately 6–7 feet and rotate at speeds up to 30 feet per second. The chill block 22 rotates in the direction of the arrow 26.

The rim 24 is the primary means by which heat is removed from the molten metal in order to promote solidification. Therefore, the rim must possess high thermal conductivity. Integrated into the chill block 22 is a means for transferring heat from the molten metal which may include a directed array of high velocity water jets 28 inside the casting rim 24. Jets include a supply 30 and drain 32.

Molten metal emerges from the nozzle 20 and travels on the casting rim 24 where it cools and solidifies sufficiently to be removed from the rim. Gas jets 34 blow an inert gas on the solidifying metal strip 35 as it travels on the rim 24 to aid in cooling and shrouding the hot metal strip. A stripper shoe 36 removes the strip of metal from the rim 24. The stripper shoe 36 can be mounted from 45 degrees past top-dead-center to as far as 120 degrees past top-dead-center. Position of the stripper shoe 36 as far as 120 degrees past top-dead-center allows time for the strip 3 to be in contact with the chill block 22 and allows for gravity to provide part of the separation force. Small amounts of solid steel may adhere to the rim 24 and can impair the casting of thin strip metal as the wheel advances through another revolution. Therefore, a wheel buffer 38 located against the rim 24 at a point in advance of the nozzle 20 cleans the rim 24 of leftover metal or other material that may have stuck to the rim so that the rim surface is clean and smooth at the point where application of the molten metal takes place.

In order to produce solid metal strip by this method, the molten metal strip must be cooled sufficiently while in contact with the chill block 22 so that it can be removed and handled. This limits the thickness of the metal strip. A thicker metal strip holds more heat and therefore a greater amount of heat must be transferred out of the thicker metal strip before it can be handled. In order to cast strips of greater thicknesses, a very high rate of heat extraction from the solidifying metal strip to the chill block is required. Good thermal contact between the chill block and the solidifying metal is therefore essential. The present invention provides for the casting of strips of greater thicknesses by use of a electromagnetic pressurization means 40 positioned so that the magnetic field produced by the electromagnetic pressurization means creates a force on the strip that tends to keep the strip in contact with the chill block thereby enhancing thermal contact between the strip and the chill block.

For purposes of flexibility, electromagnetic pressurization means 40 is adjustably mounted on coil support rails 41 that can be arc-shaped structures mounted parallel to the wheel surface allowing placement of the electromagnetic pressurization means 40 at different locations along the top of the chill block. Therefore, mounting flexibility can be provided to allow positioning of the electromagnetic pressurization means 40 along the steel strip at an optimal point relative to the nozzle 20 for maximum casting productivity. The behavior of the solidifying strip, regarding lift-off point, surface shape, rate of cooling, etc., governs the optimum position of the electromagnetic pressurization means along the chill block circumference.

The components described above, such as the electromagnetic pressurization means, are heat shielded with insulating blanketing material (not shown) to prevent radiant heat transfer and possible damage caused by the errant splashing of liquid metal.

In one embodiment of this invention the electromagnetic pressurization means 40 is an electromagnetic coil located in close proximity to the metal strip being cast. This electromagnetic coil can produce a standing magnetic wave which induces currents in the molten metal and the chilled wheel 22. These currents interact with the magnetic field to produce forces in the metal and the wheel 22.

Design and optimization of the electromagnetic pressurization means will determine the frequency of the excitation current. Very high frequency current allows short skin depth excitation of the molten metal, providing screening of flux from the chilled wheel surface (assuming a copper casting wheel), and reduced body heating of both metal and the wheel. Assembly of the high frequency conductors, lying in parallel in a slotted structure above the strip, is simple and relatively inexpensive.

Ideally, magnetofluidynamic effects should be limited to within the metal strip and excluded from the chill block substrate. This would be accomplished by choosing an excitation current of sufficiently high frequency that skin effects limit the flux from penetrating the block to any significant degree. This would entail operating at frequencies on the order of hundreds of kilohertz, and would make necessary the use of ferrite materials in place of laminated iron cores in order to reduce magnetizing losses. Trade-offs of force effects and dissipated power losses ensue when operating at lower frequencies. At normal power frequencies (60 Hz), almost no force effect is seen for even extremely high coil currents, while at the frequency of induction heating power supplies (1000 Hz), such as that available at steel foundries, moderate current levels produce reasonable steel strip pressure, but at the cost of high copper mold heating. Also produced are significant radial forces acting on the casting wheel via the copper mold magnetofluidynamic forces.

Low frequency operation can entail the complication of high tangential forces acting on the strip and chilled casting wheel as well. Another complication of low frequency operation is that the magnetofluidynamic pressurization is dependent on a good electrical contact interface between the copper mold and strip as an eddy current path. For the application of strip hold down, along the circumference of the casting wheel past top dead center, where onset of strip separation is imminent due to centrifugal forces, a poorly conducting interface can mean significant impairment of hold down forces.

In this embodiment, the magnetic coil is a single-phase high-frequency coil. Normal pressure is provided by the Lorentz body force of transverse induced current and longitudinal field, although the direction of the current could be longitudinal and the flux transverse with the same effects. In either case, the current should have uniform direction over the molten metal.

Figure 2:
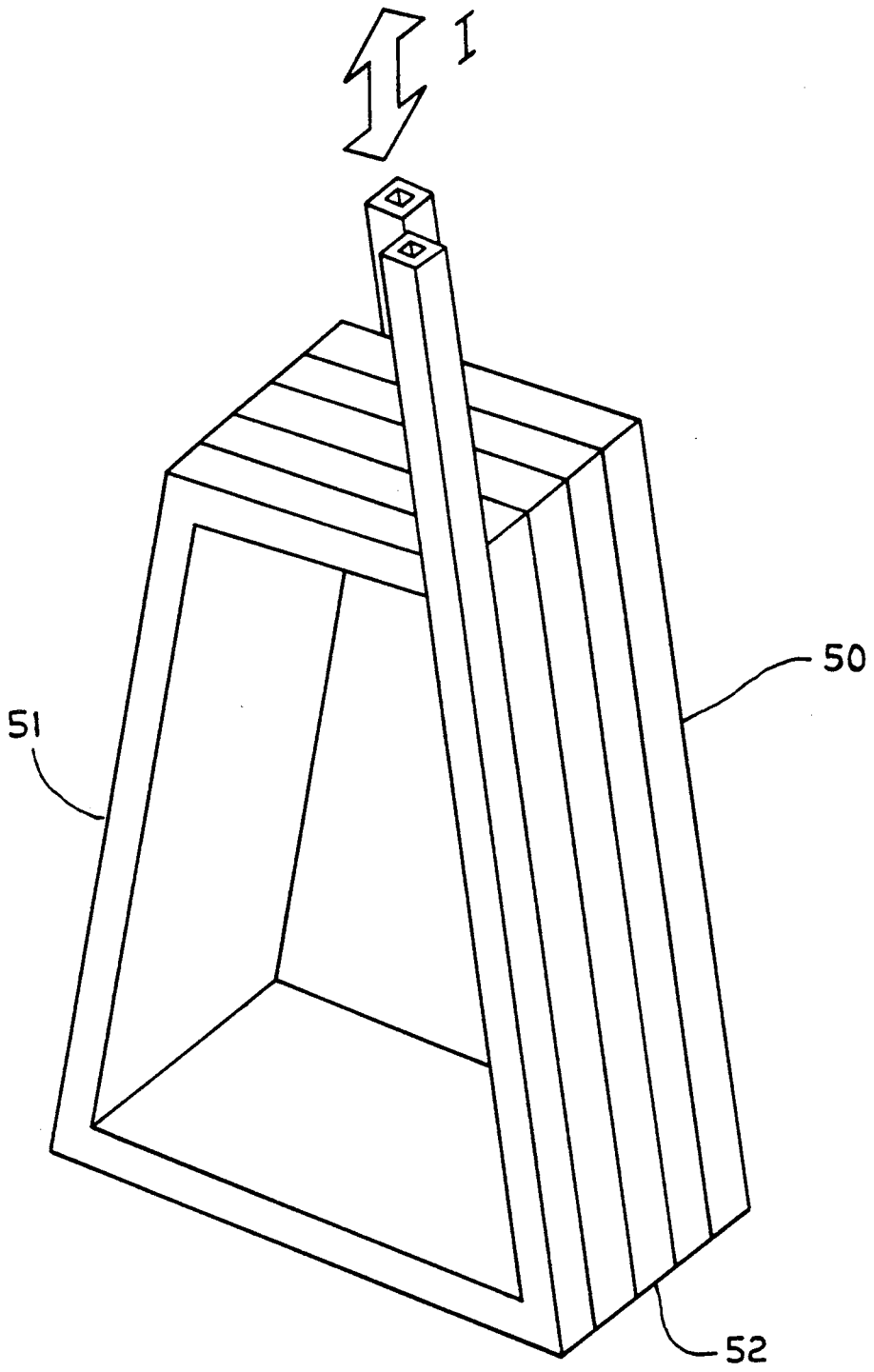
FIG. 2 depicts a large solenoid coil for one embodiment of the present invention.

FIG. 2 illustrates the construction of a magnetofluidynamic coil 50 here the large solenoidal coil design. The front side 51 faces the pouring box and bottom side 52 facing the metal strip of the coil 50 are encased in an alumina refractory material for thermal insulation and to act as a splash guard in the event of a nozzle breakout or other contingency. Terminations from coil 50 to high current flexible cable are made with standard water-cooled connectors common to welding and induction heating practice. The large solenoid coil design is made up of a series of large (height > length) turns, wound as a solenoid, yet fixed vertically normal to the surface of the strip of metal being cast. Current flows along all conductors in one direction, inducing image conductor shaped current flows in the metal.

The large solenoid coil design 50 depicted in FIG. 2 would have a relatively large air gap between it and the metal strip being cast thereby allowing room to readily shield the coil from heat and errant splashes of the molten metal. Envisioned are simply wound, water-cooled hollow copper conductors, easily fabricated to a variety of possible designs. The coils would be fairly easily modified to optimize the location and intensity of the applied magnetic field and to would be quickly and easily changed as deemed necessary.

The single phase coil provides normal force to the solidifying metal puddle on the moving chill block by the method of induced eddy currents. Time varying magnetic fields associated with alternating current in the electromagnetic pressurization means induce eddy currents in the metal strip, which interact with the impinging fields, creating a Lorentz body force radially downwards on the strip. In this embodiment, a operating frequency is determined to be approximately 640 kHz. When operated at frequencies of 400–10,000 Hz, the single phase coil provided a low tangent/normal force ratio and reasonable dissipated power and current excitation.

The effective wave speeds of the single phase high frequency coil are much greater in magnitude than the strip speed, assuring high slip (relative speed) operation for maximum magnetofluidynamic effects. The single phase high frequency coil is a device of simple construction and yet easily modified when compared to other concepts. For example, several single phase high frequency coils can be connected electrically in series or parallel providing a larger active surface of magnetic pressure. Assembly with the casting system is simple and rugged.

Two components of force are produced, one directed radially inward and one in the direction of motion. With the use of a frequency which has a characteristic time which is small compared to that of the casting process, the ratio of radial to circumferential force will be very large. The characteristic time of the caster is the length of the coil in the direction of motion divided by the casting velocity. A frequency of 1 KHz produces a ratio of approximately 20,000 for a 20 inch coil coverage of a seven foot diameter wheel. A corresponding three phase device would have a ratio of 10 when operated at 1 kHz and 3 when operated at line frequency (60 Hz), although the three phase device could have the longitudinal force directed in either the casting or anti-casting direction.

Since there is more than one direction that is tangential to the molten metal, there is more than one coil winding pattern which will produce the desired force. Three additional coil winding patterns for this embodiment of the electromagnetic pressurization means are shown in FIGS. 3*a*, 3*b*, and 3*c*.

Figure 3B:
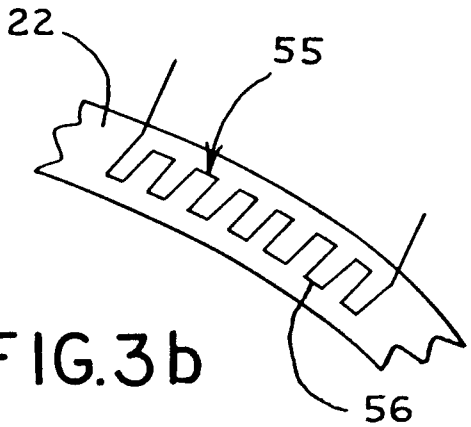
FIG. 3*b* shows another embodiment (meander) of the coil.
Figure 3C:
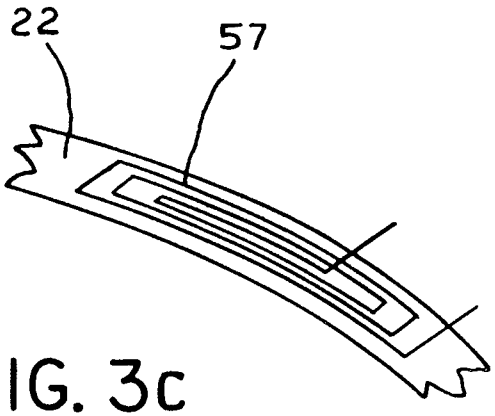
FIG. 3*c* shows another embodiment (flat) of the coil.
Figure 3A:
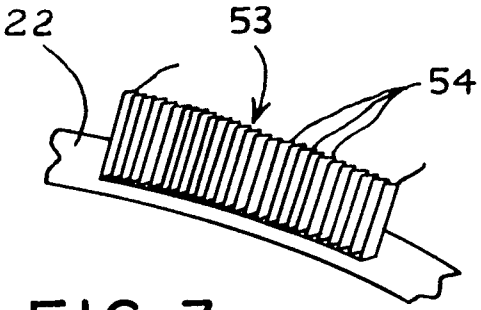
FIG. 3*a* shows another embodiment (transverse) of the coil.

Referring to FIG. 3*a*, the transverse coil 53 is a series of turns 54 (height > width) wound as a solenoid. Transverse coil is oriented transverse to the metal strip being cast so that the direction of the coil throw is in the direction of metal velocity.

Referring to FIG. 3*b*, there is depicted a meander type coil 55. It is comprised of a densely packed conductor sheet 56, with conductors placed to provide the most effective magnetic field distribution. For example, null points in the excitation field would be present where the field of one conductor cancels the field of an adjacent conductor. This situation can be minimized by providing more paths (conductors) per turn, so that only the two conductors physically adjacent have full flux cancellation. An alternative would include providing more longitudinally oriented conductor lengths and fewer transverse lengths.

Referring to FIG. 3*c*, there is depicted a flat coil 57. The flat coil 57 is a multiturn coil thrown in concentric turn 'pancake' or spiral fashion. A null line of force exists along most of the length of the coil. This drawback could be minimized by employing more circular turns.

In the case of all four patters, the return portion of the coil is far enough removed from the metal that the effects would be negligible. Also, theoretical design basis given below assumes that the portion of the coils which produce the force may be represented as current sheets which is a good approximation when the spacing between adjacent coils is small compared to the separation of the coil from the solidifying metal.

Both the longitudinal coil 50 and transverse coil 53 have large inductances and hence require a large amount of capacitance to tune the power circuit to unity power factor, but they do have uniform magnetic structures in the current sheet limit. These coils may be powered directly from a commercial supply without going through any transformer. The meander coil 55 is inherently a lower inductance winding and would require a smaller capacitance to correct the power factor. Because the coil voltage is low, it might be necessary to include a transformer in the power circuit. Also, the field structure is not as uniform and nulls will be present where the radial forces become zero.

Estimates have been made of the voltages, turns, and currents for each of the types of coil windings for a typical casting situation where a sheet of steel with a thickness of 30 mils is being produced at a rate of 10 ft/sec, and the coils are covering a 20 inch circumferential length of a 7 foot diameter wheel. The values listed are those sufficient to create a radial force which is equal to the centrifugal force for a steel sheet which is 3 inches wide. The longitudinal coil has six turns over three inches and requires 4400 A and a voltage of 730 V. The transverse coil has 15 turns over 20 inches and draws 11,800 A at 750 V. Note that a much larger current is required to produce the same force since the transverse coil has a much lower turns density. The final coil, a series of pancake coils, has the same turns density as the longitudinal coil and so requires the same number of amperes, however, because of a low inductance, the voltage required to drive the current is only 180 V. All three of these coils were assumed to be hollow water cooled copper conductors. The water cooling is necessary due to the high currents being carried. Also, the coils are cast in a fused silica refractory for protection and structural support and the working portion of the coils are located approximately two inches from the solidifying steel.

The different coil design configurations of this embodiment can be adapted to different casting requirements based upon their relative advantages. The large solenoid coil design is a very simply constructed, easily mounted, and inexpensively fabricated. Compared to the transverse solenoidal coil, the large solenoid coil required less voltage (i.e., fewer turns), less series current, less copper per unit length of steel surface, and therefor lower power consumption. The flat spiral coil design in contrast to the large solenoid coil does not require copper return paths, and therefor provides enhanced reliability. However, the flat spiral coil is relatively low-voltage (low inductance) device, and in all specific designs investigated, required application of a step-down, high current transformer to match the applied magnetofluidynamic system voltage of available power supplies.

Figure 4:
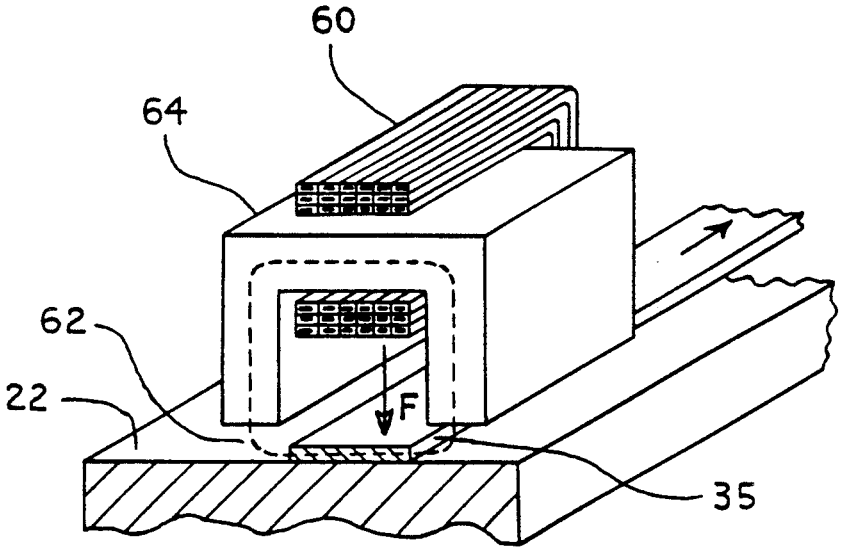
FIG. 4 shows another embodiment of the electromagnetic pressurization means.

Referring to FIG. 4, there is depicted another embodiment of the electromagnetic pressurization means 40 of the present invention. This embodiment obtains from the principle that force effects in almost any electromagnetic device configuration can be enhanced with the presence of a core of ferromagnetic material, such as special steel laminations or ferrite materials. By winding the coils around an iron C- or U-shaped core and directing the air gap flux carefully toward the molten metal, the significant forces can be exerted on the molten strip, both in a lateral and normal direction. In this embodiment, the electromagnetic pressurization means 40 comprises a high frequency electric coil wound around a core made of a ferromagnetic material which includes an air gap. This air gap can be oriented in one of several ways toward the molten metal. The alternating magnetic field in the gap induces eddy currents in the metal which interact with the impinging field to provide the pressurizing body force. This embodiment provides greater forces than the previous embodiment which does not employ a ferromagnetic core. With the addition of flux guiding techniques, it can provide controlled shaping forces to modify or contour the molten metal flow.

FIG. 4 shows this embodiment as applied to either the planar-flow and melt-overflow processes. Alternating current in the coil winding 60 creates a time-varying flux crossing the air gap 62 of the core 64, which in turn induces eddy currents to flow in the nearby liquid metal 35. Interaction between the impinging field and the eddy currents creates a body force F on the metal 35. The direction and magnitude of the force can be controlled to some degree by alternating the geometry of the system, but generally the force is exerted evenly and downward normal to the metal surface.

The advantages of using this embodiment in place of an open conductor configuration described in the previous embodiment include: enhanced hold down forces resulting in greater heat transfer, optimized nozzle performance, minimization of stray field environmental effects, and concentration of forces and the retarding force that will act to damp out surface waves.

Figure 5A:
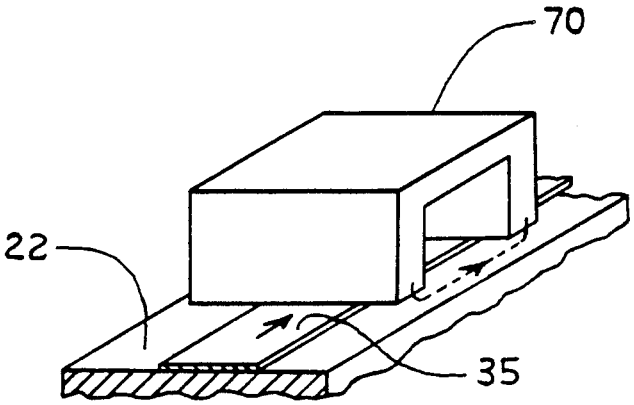
FIG. 5*a* shows another embodiment of the electromagnetic pressurization means.
Figure 5B:
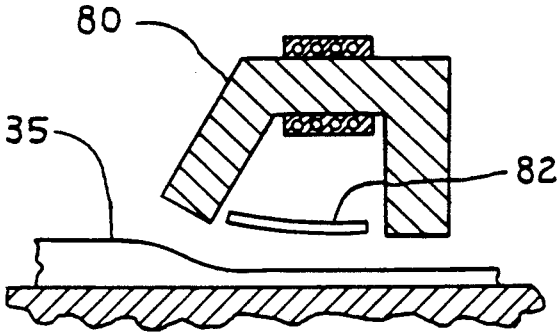
FIG. 5*b* shows another embodiment of the electromagnetic pressurization means.

As in the previous embodiment, there are different orientations of the electromagnetic pressurization means. One orientation as depicted in FIG. 4 has already been described. Two other orientations of this embodiment are depicted in FIGS. 5*a* and 5*b*. The orientation depicted in FIG. 4 shows the transverse field variation. The transverse field orientation of FIG. 4 is ideal for narrow strip production. FIG. 5*a* depicts a longitudinal field orientation. In the longitudinal field orientation, the coil 70 is arranged so that the field is parallel to the direction of the metal strip movement. It is suited to planar-flow and melt-overflow processes where wide strip widths are planned. A secondary effect of this arrangement, besides the high normal forces developed, will be a back-pressure operating on the metal strip as it enters into the air gap active region, as well as some forward force upon its exit.

FIG. 5*b* shows another design of this embodiment that includes a modification to the geometry of the iron structure core 80 and the use of a flux shield 82. Flux shield 82 is made of high conductivity copper plates that prevents the magnetic flux to pass. This alters the effective shape of the flux path in the air gap and directs the flux to specific locations on the strip. This design suggests the possibilities for further enhancements to the casting process through the use of the electromagnetic pressurization means.

The application of flux concentrated pressurization can also be employed to overcome some of the aforementioned limitation associated with use of lower frequency excitation currents. For the application of flux concentrated pressurization directed at the outlet of the nozzle located behind top dead center, excellent thermal contact exists between the chill block and the molten metal strip, thereby providing a superior electrically conductive interface. Thus the problem of poorly established return current paths is not nearly so great in the flux concentrated pressurization applications of low frequency magnetofluidynamic enhancement in the nozzle exit region.

The required operating characteristics are determined by the desired force effect. The net force on the steel can be modeled as an equivalent radial pressure acting on the outer surface of the steel. The equivalent pressure is given in Equation 1

$$P = \frac{\mu_0 H^2}{2} \text{ [newtons/meter}^2\text{]} \quad (1)$$

where H is the RMS value of tangentially directed air gap field intensity, and $\mu_o$ is the permeability of free space.

The current required by the coil is given by Equation 2.

$$I = H\frac{1}{N} \text{ [amps]} \quad (2)$$

where 1 is the effective air gap length, and N is the number of coil series turns.

The voltage E for the device is given by Equation 3, where the air gap magnetic field B is shown by its peak value, A is the effective air gap cross section area, and F is the frequency of excitation.

$$E = 4.44\ f \times B \times A \times N \text{ [volts]} \quad (3)$$

The above expressions presume very low reluctance of any iron or ferrite path in the magnetic circuit. Proper selection of the core materials and construction, for example, using thin section, high grade magnetic iron laminations, would ensure this condition.

It is recognized that increased heat is generated in the chilled wheel and that some radial forces are also generated in the wheel. The heat generated in the chilled wheel is insignificant compared to the heat being taken out of the metal steel and the forces are small enough to require no changes in the mechanical design of the wheel.

The benefits of this invention include: simple integration with planar flow casters, radial pressure independent of casting velocity, negligible longitudinal forces, constant frequency excitation for all casting speeds, and simple and rugged mechanical design.

The embodiments of the invention in which an exclusive property or privilege is claimed are defined as follows:

1. A system for the casting of thin strips of metal including:

a reservoir for the containment of the molten metal to be cast and having a nozzle from which molten metal be poured, a movable chill block located adjacent the nozzle of said reservoir and capable of removing heat from a molten metal poured from said reservoir onto said movable chill block, and electromagnetic pressurization means adjustably mounted relative to the nozzle and over said movable chill block so that the molten metal poured from said reservoir onto said chill block passes only under said electromagnetic pressurization means and over said chill block, and further wherein said electromagnetic pressurization means produces a standing magnetic wave field that induces currents in the molten metal and chill block, and the current interacts with the magnetic field to generate a force on the molten metal on said movable chill block in the direction toward said chill block.

2. The system of claim 1 in which said electromagnetic pressurization means is an electromagnetic coil, said coil comprising a single-phase high frequency coil.

3. The system of claim 2 in which said electromagnetic coil is a solenoid coil having windings parallel to the direction of movement of said movable chill block.

4. The system of claim 2 in which said electromagnetic coil is a transverse solenoid coil having windings perpendicular to the direction of movement of said movable chill block.

5. The system of claim 2 in which said electromagnetic coil is a meander coil having windings generally perpendicular to the direction of movement of said movable chill block and further in which all the windings of said meander coil are located in a plane parallel to the direction of movement of said movable chill block.

6. The system of claim 2 in which said electromagnetic coil is a flat spiral coil having spiral windings and further in which all the windings of said flat spiral coil are located in a plane parallel to the direction of movement of said movable chill block.

7. The system of claim 1 in which said electromagnetic pressurization means includes:

magnetic poles, a core connecting said magnetic poles, and an electromagnetic coil wound around said core.

8. The system of claim 7 in which said magnetic poles are located with respect to said movable chill block so that an electromagnetic field between said poles is perpendicular to the direction of movement of said movable chill block.

9. The system of claim 7 in which said magnetic poles are located with respect to said movable chill block so that an electromagnetic field between said poles is parallel to the direction of movement of said movable chill block.

10. The system of claim 7 in which said electromagnetic pressurization means includes: a flux shield located with respect to said poles so that flux from said electromagnetic pressurization means is concentrated on a molten metal disposed on said movable chill block.

11. The system of claim 10 in which said flux shield comprises a high conductivity copper plate.

12. The system of claim 2 in which said movable chill block comprises a rotating casting wheel.

13. In a system for the casting of thin strips of metal having:

a reservoir for the containment of the molten metal to be cast and having a nozzle from which molten metal can flow, and a movable chill block located adjacent the nozzle of the reservoir and capable of removing heat from molten metal poured from the reservoir onto the movable chill block, an improvement comprising:

electromagnetic pressurization means adjustably mounted relative to the nozzle and over the movable chill block so that the molten metal poured from the reservoir onto the chill block passes only under said electromagnetic pressurization means and over the chill block, and further wherein said electromagnetic pressurization means produces a standing magnetic wave field that induces currents in the molten metal and chill block, and the current interacts with the magnetic field to generate a force on the molten metal on the chill block in the direction toward the chill block.

14. The improvement of claim 13 in which said electromagnetic pressurization means is an electromagnetic coil, said coil comprising a single-phase high frequency coil.

15. The improvement of claim 14 in which said electromagnetic coil is a solenoid coil having windings parallel to the direction of movement of the movable chill block.

16. The improvement of claim 14 in which said electromagnetic coil is a transverse solenoid coil having windings perpendicular to the direction of movement of the movable chill block.

17. The improvement of claim 14 in which said electromagnetic coil is a meander coil having windings generally perpendicular to the direction of movement of the movable chill block and further in which all the windings of said meander coil are located in a plane parallel to the direction of movement of the movable chill block.

18. The improvement of claim 14 in which said electromagnetic coil is a flat spiral coil having spiral windings and further in which all the windings of said flat spiral coil are located in a plane parallel to the direction of movement of the movable chill block.

19. The improvement of claim 13 in which said electromagnetic pressurization means includes:

magnetic poles, a core connecting said magnetic poles, and an electromagnetic coil wound around said core.

20. The improvement of claim 19 in which said magnetic poles are located with respect to the movable chill block so that an electromagnetic field between said poles is perpendicular to the direction of movement of the movable chill block.

21. The improvement of claim 19 in which said magnetic poles are located with respect to the movable chill block so that an electromagnetic field between said poles is parallel to the direction of movement of the movable chill block.

22. The improvement of claim 19 in which said electromagnetic pressurization means includes:

a flux shield located with respect to said poles so that flux from said electromagnetic pressurization means is concentrated on a molten metal disposed on the movable chill block.

23. The improvement of claim 22 in which said flux shield comprises a high conductivity copper plate.

24. The improvement of claim 13 in which the movable chill block comprises a rotating casting wheel.

25. A method for the casting of thin strips of metal including:

pouring molten metal to be cast from a reservoir onto a moving chill block, removing heat from the molten metal poured from the reservoir onto the moving chill block, producing a standing magnetic field that induces currents in the molten metal and chill block, causing the currents to interact with the magnetic field to generate a force on the molten metal on the chill block in the direction toward the chill block, whereby thermal contact between the moving chill block and the molten metal on the moving chill block can be maintained.

26. The method of claim 25 in which said step of producing a magnetic field is further characterized by: producing a magnetic field having a frequency of approximately 640 kilohertz.

27. The method of claim 25 in which said step of pouring molten metal is further characterized by:

pouring molten metal to be cast from a reservoir onto a rotating chill wheel.

28. The method of claim 27 in which said step of pouring molten metal is further characterized by:

pouring molten metal to be cast from a reservoir onto a rotating chill wheel that rotates at a speed of approximately 30 feet per second.

29. The method of claim 25 in which said step of pouring molten metal is further characterized by:

pouring molten metal to a thickness of up to 0.125 inches from a reservoir onto a moving chill block to be cast.

* * * * *